United States Patent [19]

Hirata et al.

[11] 4,450,927
[45] May 29, 1984

[54] APPARATUS FOR CONTROLLING AGRICULTURAL TRACTOR

[75] Inventors: Kazuo Hirata, Sakai; Masao Takagi, Hashimoto, both of Japan

[73] Assignee: Kubota, Ltd., Osaka, Japan

[21] Appl. No.: 376,500

[22] Filed: May 10, 1982

[30] Foreign Application Priority Data

Jun. 9, 1981 [JP] Japan .............................. 56-85290[U]

[51] Int. Cl.³ .............................................. B62D 1/18
[52] U.S. Cl. .................................................. 180/330
[58] Field of Search ............. 180/315, 326, 330, 89.12

[56] References Cited

U.S. PATENT DOCUMENTS 3,550,715 12/1970 Johnson ............................... 180/315
4,206,825 6/1980 van der Lely .................... 180/89.12

FOREIGN PATENT DOCUMENTS 993019 5/1965 United Kingdom ................ 180/330

Primary Examiner—John A. Pekar
Assistant Examiner—D. Lynn Fugate
Attorney, Agent, or Firm—Cushman, Darby & Cushman

[57] ABSTRACT

An agricultural tractor in which two sets of pedals are mounted on the tractor body forwardly and rearwardly with the rearward pedals at a higher position than the forward pedals. A seat can be selectively fixed at a rearward position opposed to the forward pedals or a forward position opposed to the rearward pedals, the forward position of the seat being higher than the rearward position. A steering wheel can be fixed to either a forward or rearward position corresponding to the position of the seat.

5 Claims, 22 Drawing Figures

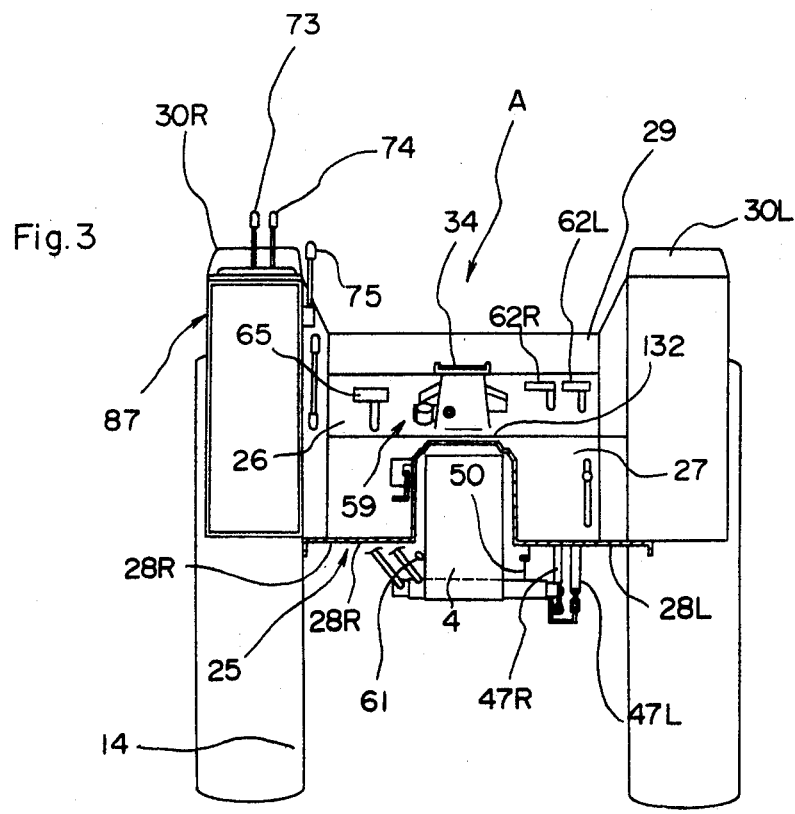
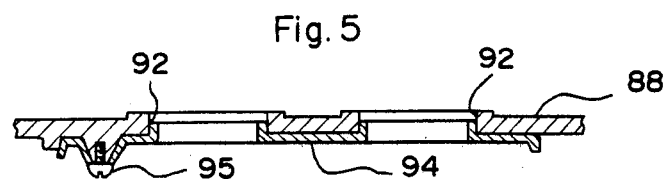
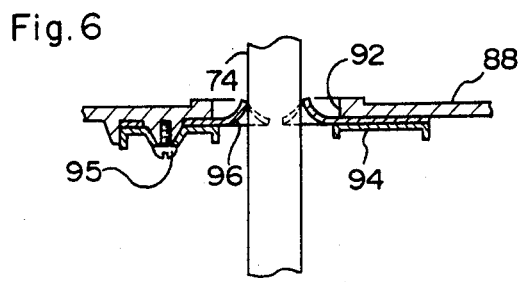
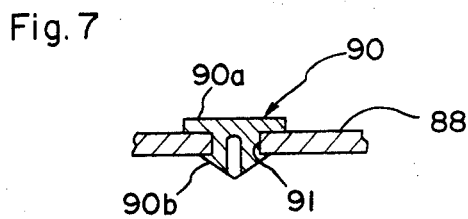

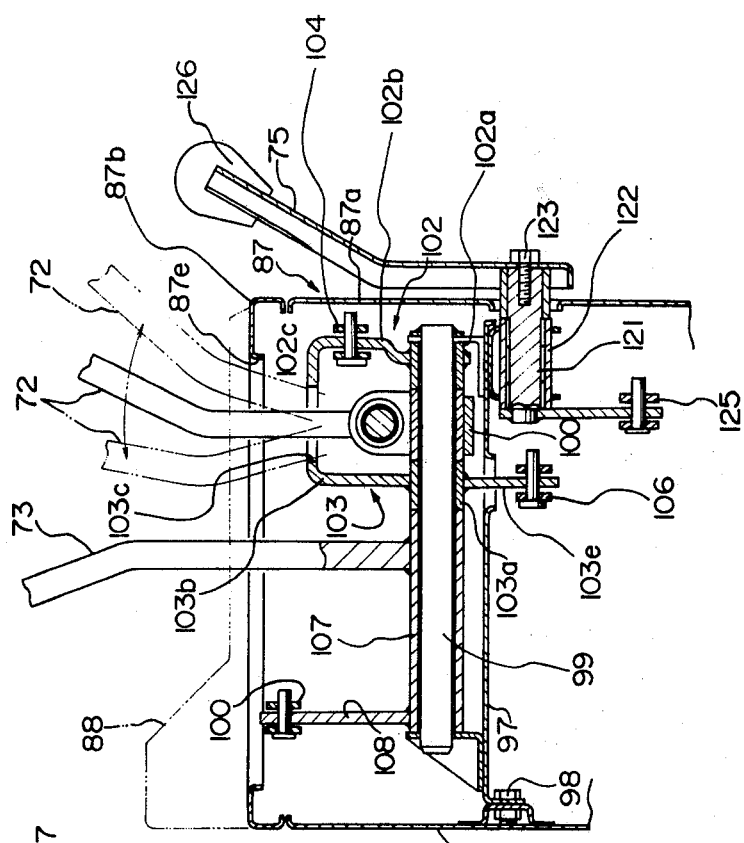
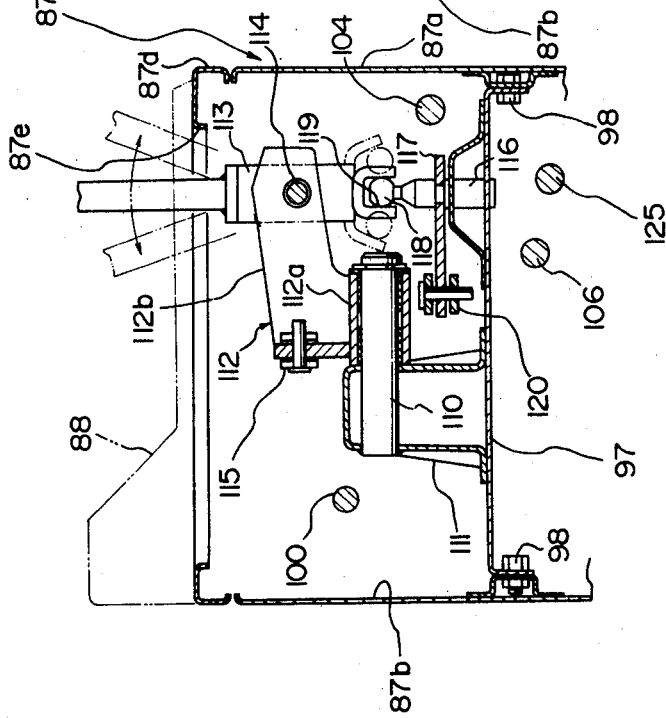
Fig. 9
Fig. 10

APPARATUS FOR CONTROLLING AGRICULTURAL TRACTOR

BACKGROUND OF THE INVENTION

1. Field of the Invention

The present invention relates to a control apparatus for agricultural tractors, and more particularly to an apparatus for effecting speed change control with increased ease.

2. Description of the Prior Art

The speed change levers of control apparatus for agricultural tractors are usually arranged approximately at the midportion of the width of an operator's station comprising a steering wheel, an operator's seat, etc., i.e. at a location close to the crotch of the operator on the seat. Accordingly the speed change levers are not easy to manipulate, while these levers limit the range of movement of the operator to render the operator's station uncomfortable for the operator to ride in. Such discomfort and difficulty in manipulation further pose problems in controlling the tractor with safety.

SUMMARY OF THE INVENTION

The main object of the present invention, which has been accomplished in view of these problems heretofore encountered, is to provide a speed change apparatus for tractors which can be manipulated with increased ease and enhanced safety while permitting the operator to ride on the tractor with comfort. The present invention is characterized in that a plurality of speed change levers are arranged concentrically at one side of the operator's station of the vehicle.

The speed change levers, which are arranged concentrically at one side of the operator's station according to this invention, are easy to manipulate while rendering the station comfortable for the operator to ride in unlike the conventional operator's station wherein the speed change levers are located close to the crotch of the operator, consequently assuring increased safety in controlling the tractor. Because of these features, the present apparatus is simple in construction and is also usable for conventional tractors which are adapted to be driven by the operator in a forward posture.

Other objects and advantages of the present invention will become apparent from the following description.

BRIEF DESCRIPTION OF THE DRAWINGS

FIG. 3 is a view in section taken along the line III—III in FIG. 1;

FIG. 5 is a view in section taken along the line V—V in FIG. 4;

FIG. 6 is a view showing a modification of a portion of the embodiment in section corresponding to the section taken along the line V—V in FIG. 4;

FIG. 7 is a view in section taken along the line VII—VII in FIG. 4;

FIG. 9 is a view in section taken along the line IX—IX in FIG. 4;

FIG. 10 is a view in section taken along the line X—X in FIG. 4;

DESCRIPTION OF THE PREFERRED EMBODIMENTS

Figure 1:
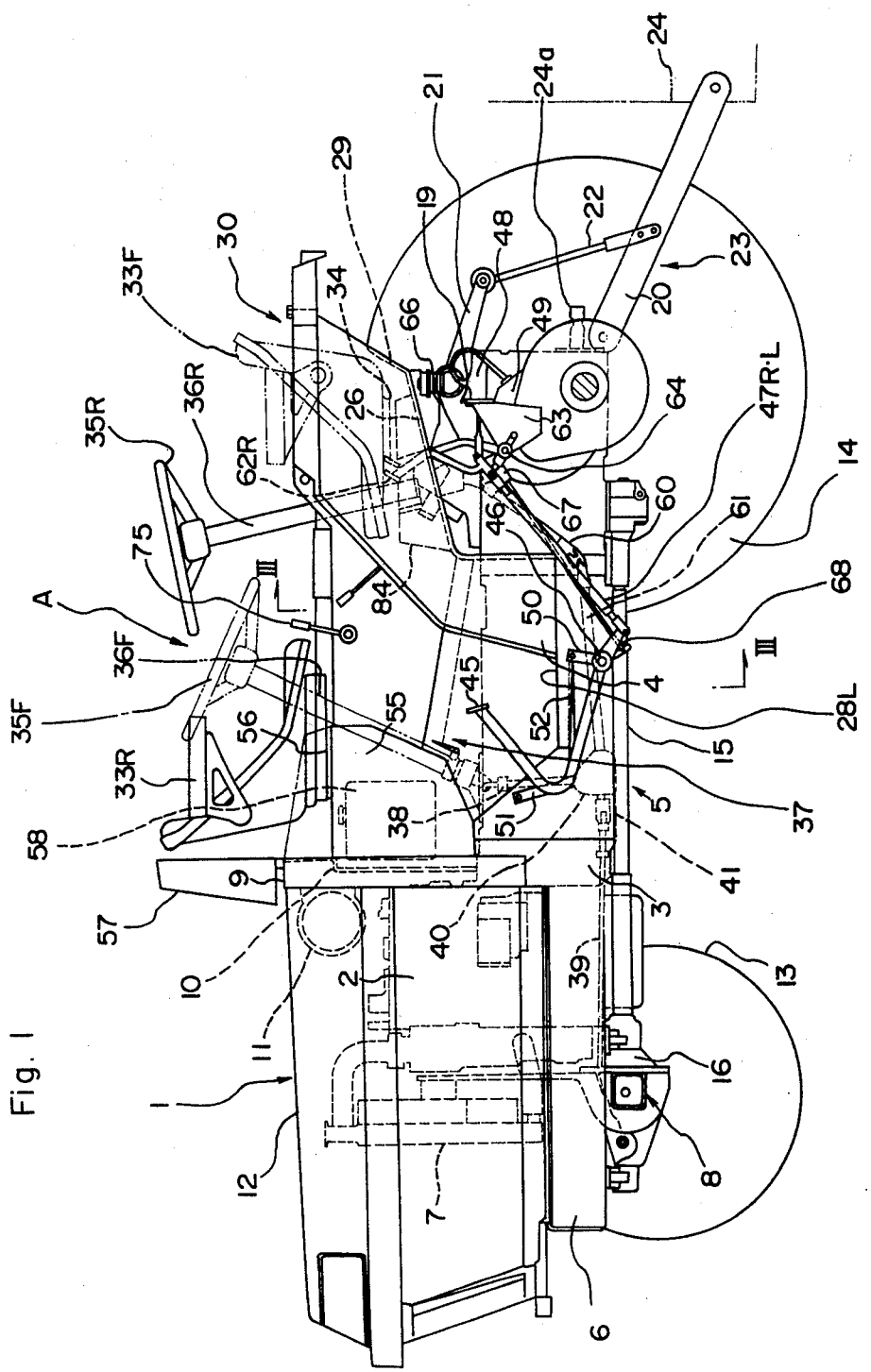
FIG. 1 is a side elevation showing an embodiment of the invention in its entirety.
Figure 2:
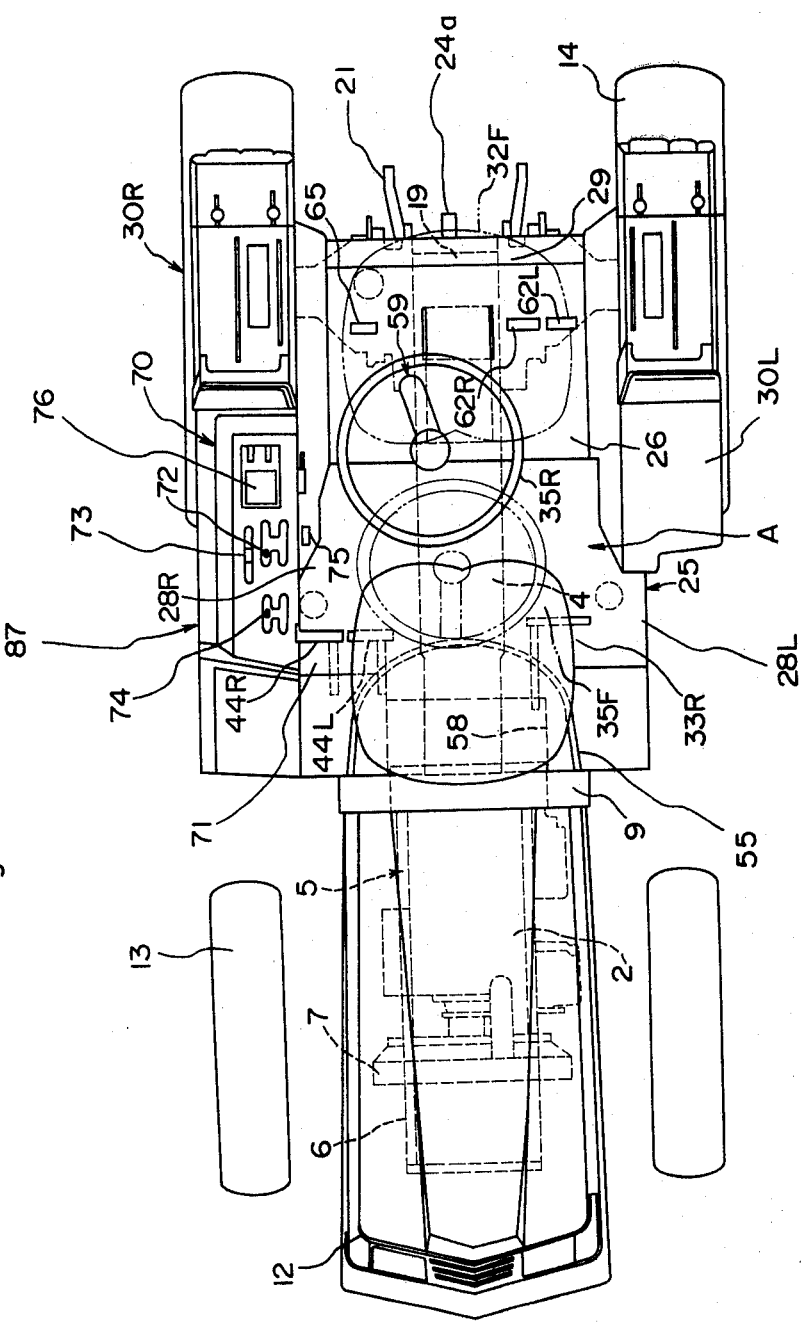
FIG. 2 is a plan view of FIG. 1.
Figure 4:
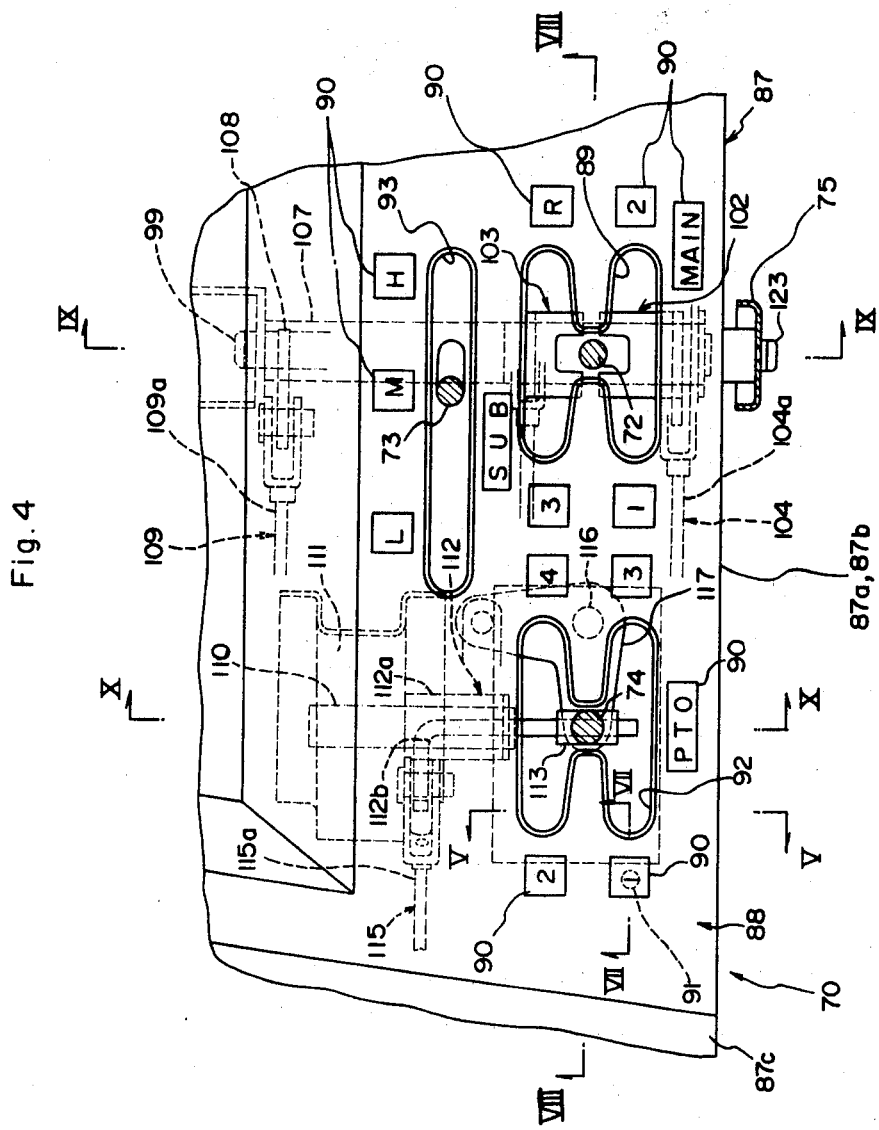
FIG. 4 is a fragmentary enlarged view of FIG. 2.
Figure 8:
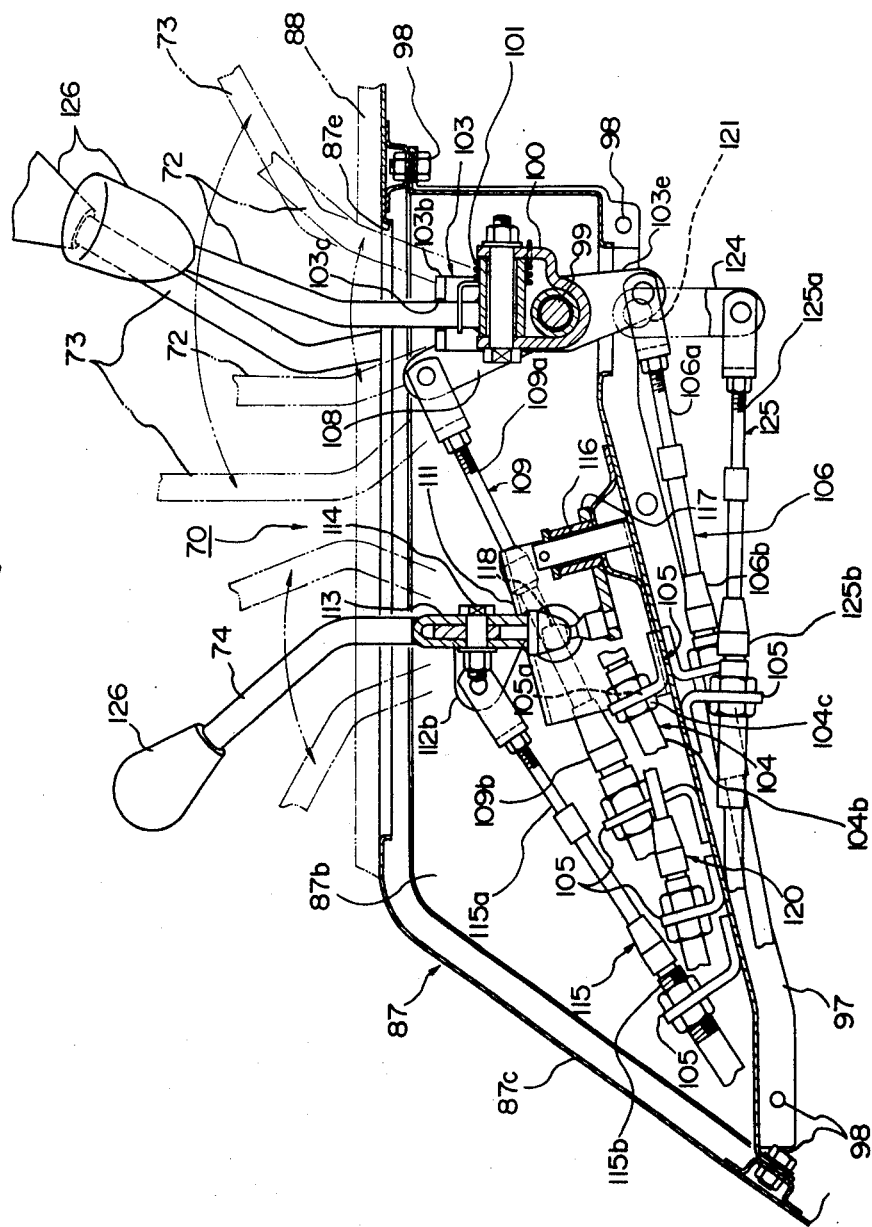
FIG. 8 is a view in section taken along the line VIII—VIII in FIG. 4.
Figure 11:
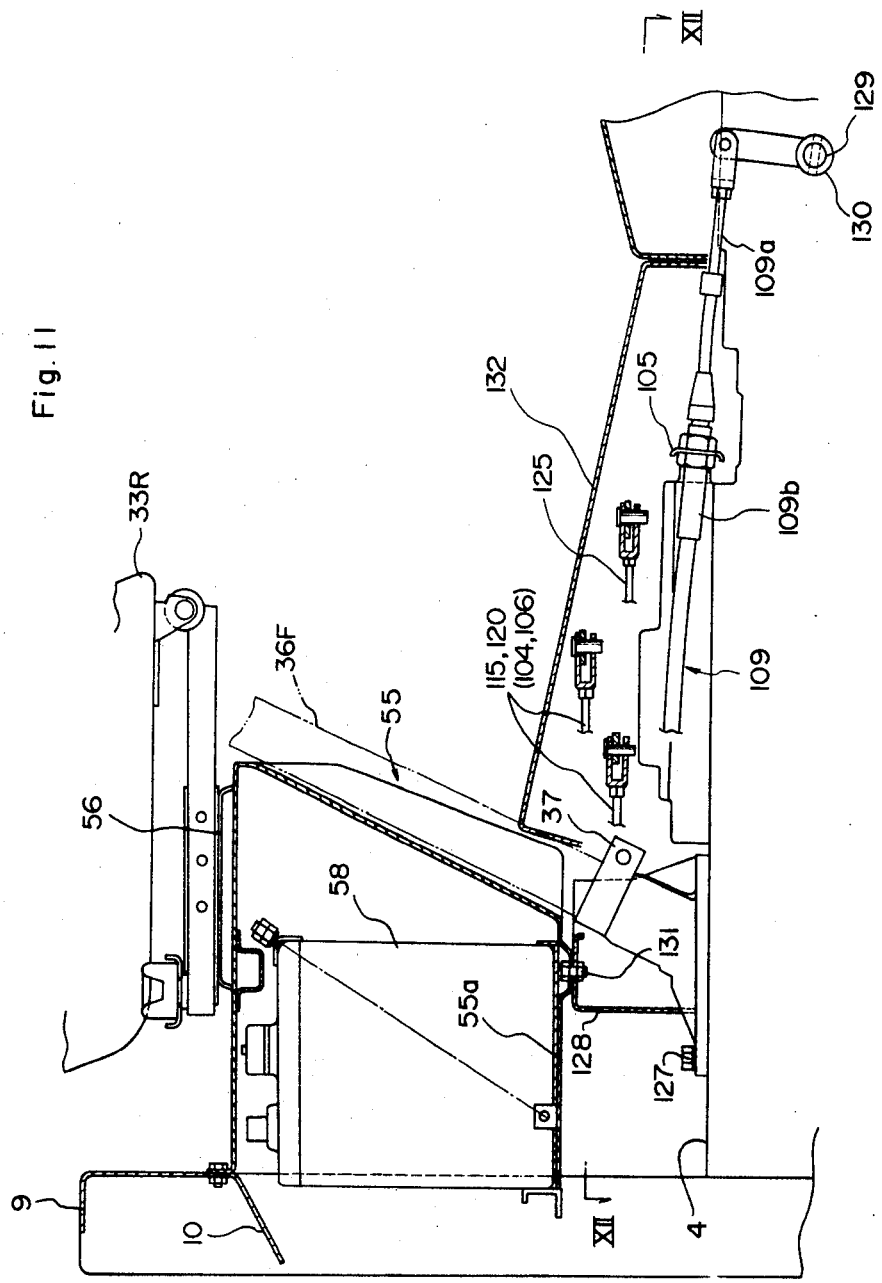
FIG. 11 is a fragmentary enlarged view in section of FIG. 1.
Figure 12:
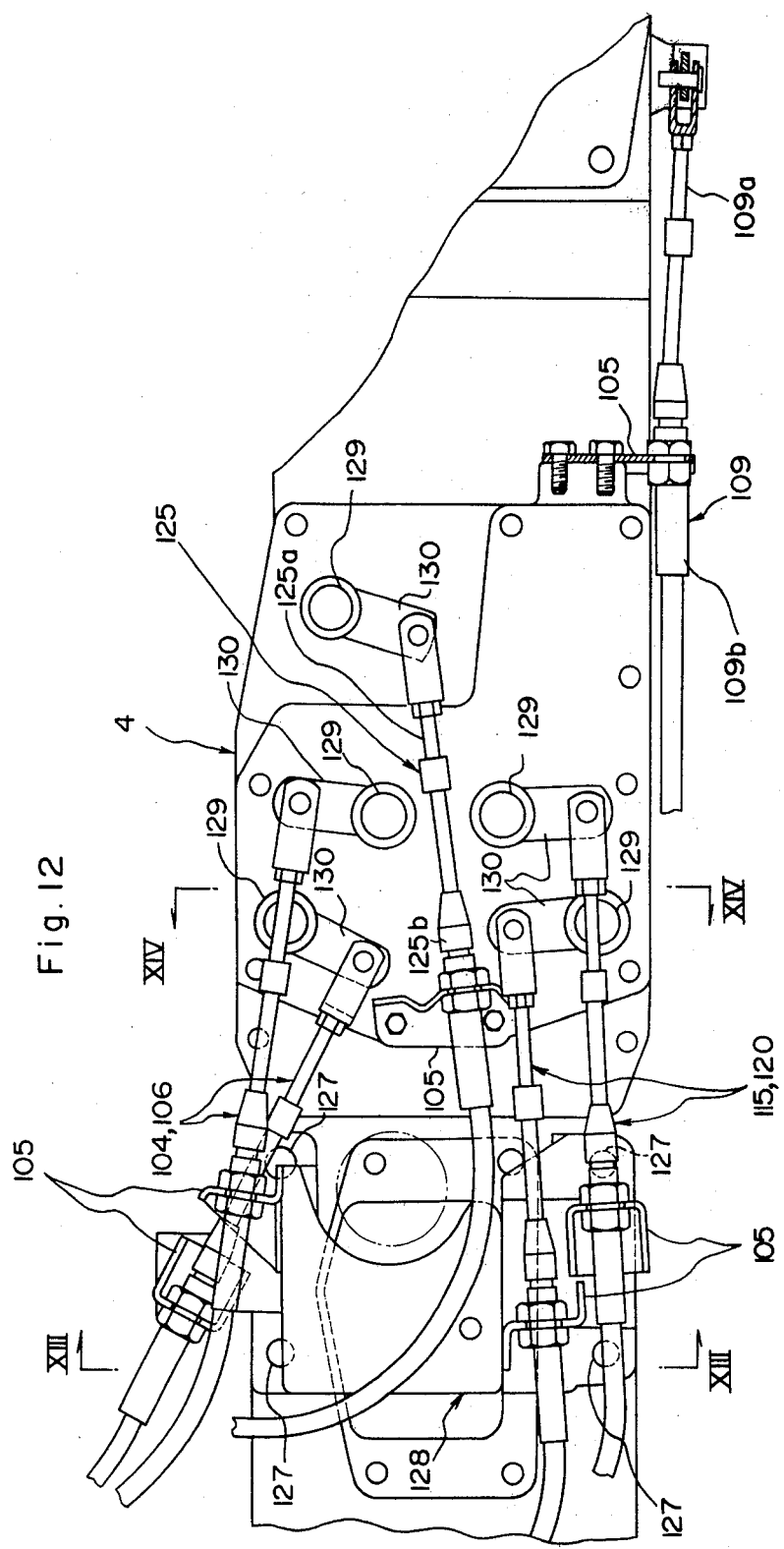
FIG. 12 is a view in section taken along the line XII—XII in FIG. 11.
Figure 13:
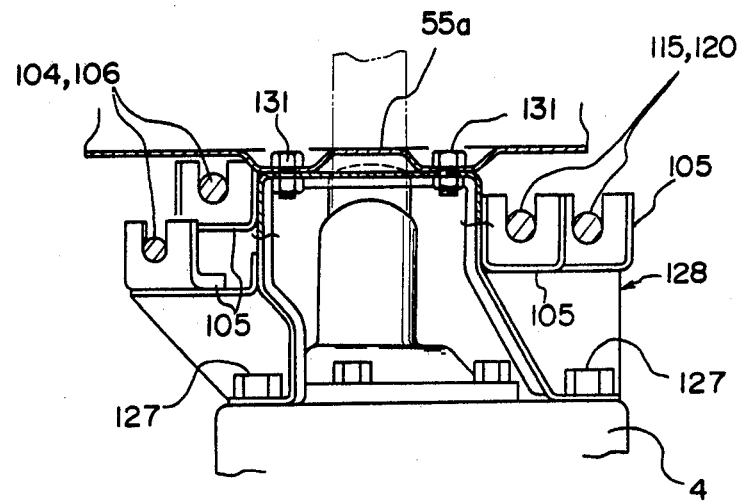
FIG. 13 is a view in section taken along the line XIII—XIII in FIG. 12.
Figure 14:
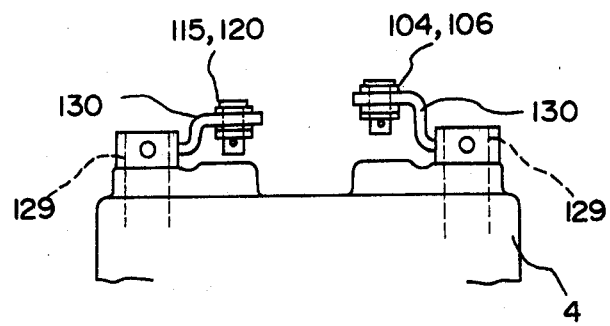
FIG. 14 is a view in section taken along the line XIV—XIV in FIG. 12.
Figure 15:
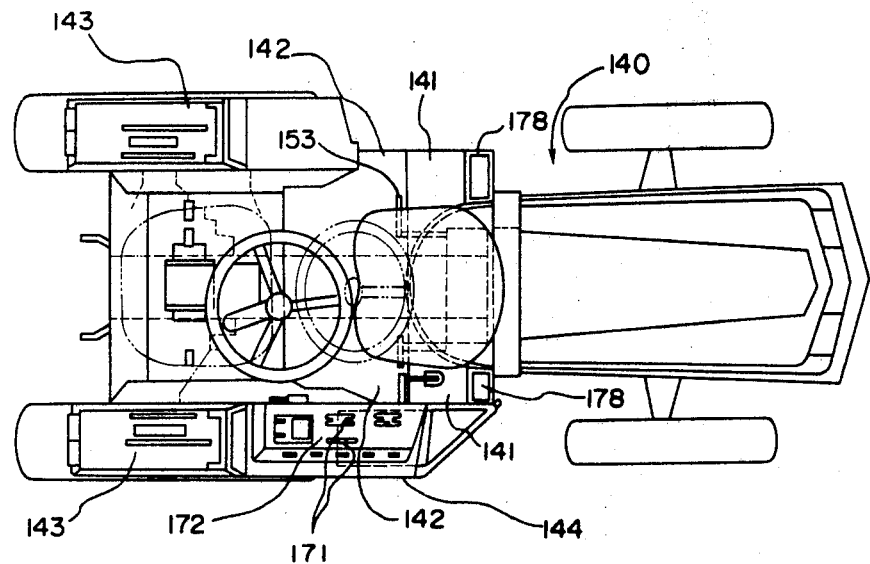
FIG. 15 is a plan view showing another tractor embodying the invention.
Figure 18:
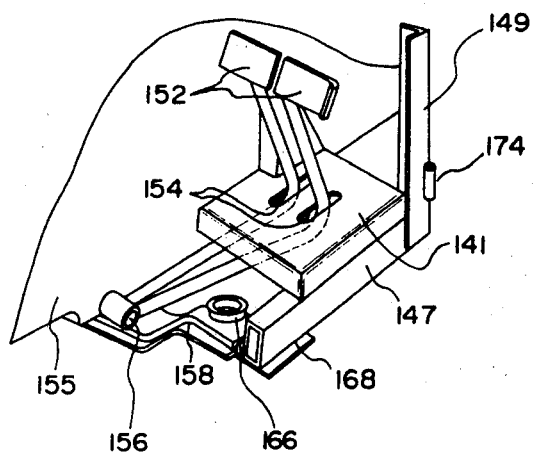
FIG. 18 and FIG. 19 are perspective views showing a step support assembly.
Figure 16:
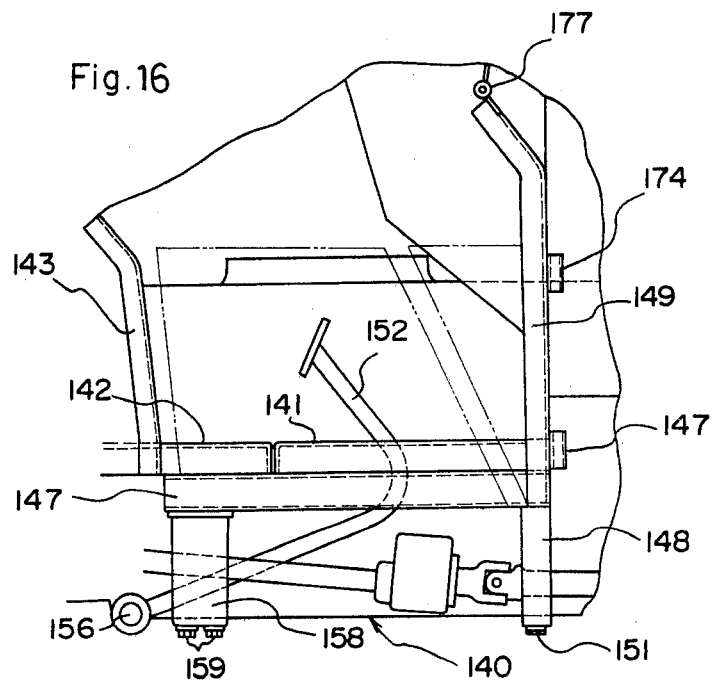
FIG. 16 is a fragmentary side elevation of the same.
Figure 17:
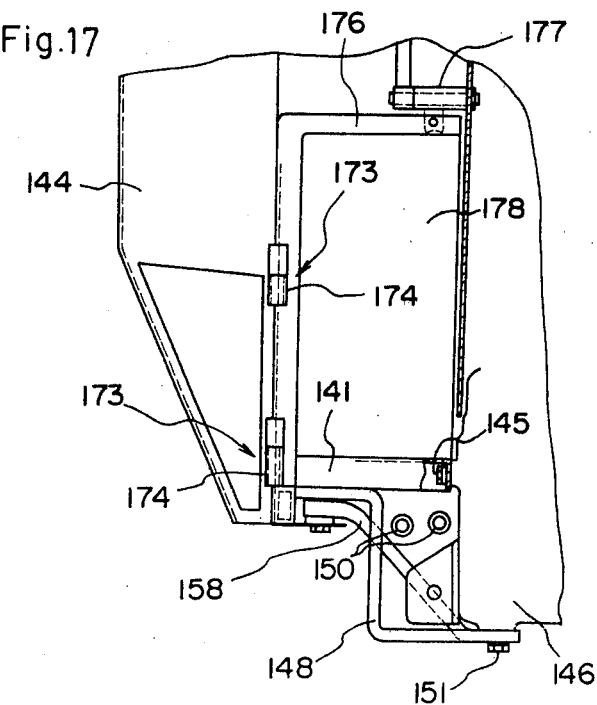
FIG. 17 is a fragmentary front view of the same.
Figure 19:
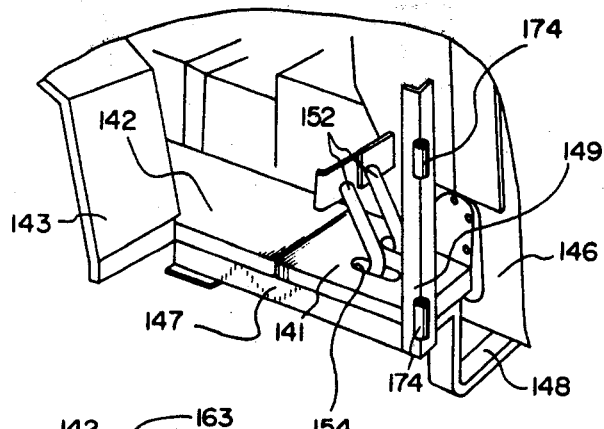

With reference to FIGS. 1 to 3, a tractor 1 adapted to be driven forward and backward has a body 5 comprising an engine 2, a clutch housing 3, a transmission case 4, etc. A pair of opposite frames 6 fixed to the engine 2 have a radiator 7 mounted thereon and support a front axle 8.

A frame 9 fixed to the clutch housing 3 has a shield plate 10 in its interior. An air cleaner 11 is disposed in front of the shield plate 10. The air cleaner 11, the engine 2 and the radiator 7 are covered with a bonnet 12.

The tractor 1, which is of the four wheel drive type, has front wheels 13, rear wheels 14, a propelling shaft 15 for driving the front wheels 13 and a front wheel differential gear 16.

A hydraulic unit 19 is mounted on a rear upper portion of the transmission case 4 and has a pair of opposed lower links 20 pivoted to rear lower portions of the unit. Lift arms 21 of the hydraulic unit 19 are connected to lower links 20 by lift rods 22. The lower links 20 and an unillustrated top link constitute a three-point link assembly 23 for vertically movably attaching to the tractor a rotary tiller, sowing device, fork lift, snow sweeper or like working implement 24. A PTO shaft 24a extending from the rear end of the transmission case 4 is coupled to the working implement 24 by a universal joint.

The top of the hydraulic unit 19 is covered with a floor sheet portion 26 of a cover 25 which further includes opposite front sheet portions 27 extending downward from the front end of the floor sheet portion 26, a pair of forward travel step portions 28R, 28L extending forward from the lower ends of the front sheet portions 27, and a connecting portion 29 extending rearwardly upward from the rear end of the floor sheet portion 26. These portions are shaped integrally from a plate of metal or reinforced plastic.

A pair of fenders 30 covers the inner, top and front upper portions of the opposite rear wheels 14. The side edges of the cover 25 are secured to the fenders, or the fenders are made from the same material as the cover 25 and are integral therewith.

A mount 34 for detachably supporting a seat 33F for forward travel is provided on the floor sheet portion 26 centrally thereof. In front of the mount 34 therebelow, a mount 37 is mounted on the transmission case 4 for a post 36F having at its upper end a steering wheel 35F for forward travel. Extending from the mount 37 to the front wheels 13 is a steering mechanism 41 including interconnecting rods 38, 39, interconnecting box 40, etc., through which the front wheels 13 can be steered by the manipulation of the wheel 35F. These wheel 35F, seat 33F, etc. provide an operator's station A.

Right and left brake pedals 44R, 44L and a clutch pedal 45 are supported on a pedal shaft 46. The depression of the brake pedals 44R, 44L is delivered through rods 47R, 47L to a pair of hydraulic cylinders 48, causing the pressure oil thereof to operate hydraulic brakes 49 on the opposite sides of the transmission case 4. The depression of the clutch pedal 45 is delivered through levers 50, 51 and a rod 52 to the clutch within the clutch housing 3 to disengage the clutch.

The above construction is substantially the same as those of known tractors adapted to be driven by the operator in a forward posture. The tractor 1, which travels forward and rearward, further includes the following components and is therefore modified in construction.

A box 55 is attached to the frame 9 in front of the forward wheel post 36F, is open at its top and has a mount 56 for a seat 33R for reverse travel. A cover 57 pivoted to the frame 9 is fittable to the box 55, which has a battery 58 in its interior.

On the right side of the hydraulic unit 19 on the transmission case 4, there is provided a mount 59 for a post 36R having at its upper end a steering wheel 35R for reverse travel. Interconnecting rods 60 and 61 extend from the mount 59 to the interconnecting box 40 to transmit the movement of the reverse steering wheel 35R to the box 40 for steering the front wheels 13.

The seat 33R, steering wheel 35R and post 36R for reverse travel are exactly the same as those for forward travel. Only one set of these components is prepared for the tractor 1. The seat and the post are removably attached to the mounts 34, 37 or 56, 59 alternatively for forward travel or for reverse travel.

A pair of reverse brake pedals 62R, 62L arranged on the left side of the hydraulic unit 19 are supported by a pivot 64 on a bracket 63 for fixing the hydraulic cylinder 48 to the vehicle body 5 and are coupled to the rods 47R, 47L respectively for operating the pair of hydraulic cylinders 48.

A reverse clutch pedal 65 disposed on the right side of the hydraulic unit 19 is supported on a pivot (not shown) coaxial with the pivot 64 to deliver the depression of the pedal 65 to the lever 50 beyond the unit 19 and through a rod 66 supported on the pivot 64, a rod 67 connected to the rod 66 and an arm 68.

Between the box 55 and the left fender 30L on one side of the operator's station A, there is provided a space for the operator to ride on and alight from the tractor therethrough. A control panel assembly 70 and a switch box 71 are arranged between the box 55 and the right fender 30R on the other side of the station A.

The control panel assembly 70 includes a main speed change lever 72, an auxiliary (sub) speed change lever 73, a PTO speed change lever 74 and a speed change lever 75 for super-reduction, and instruments such as a tractor meter 76, fuel gauge, easy checker, etc. These speed change levers, as well as the instruments, are arranged to be readily accessible to the operator. The speed change levers 72 to 75 are coupled to shifters within the transmission case 4 by Bowden cables or the like for the transmission of control forces.

With reference to FIGS. 4 to 7, the control panel assembly 70 has a panel main body 88 removably attached by bolts or the like to the top opening portion of a side box 87 provided in front of the right fender 30R. The panel main body 88 is formed with an aperture 89 H-shaped when seen from above and having the main speed change lever 72 extending therethrough. The lever 72 is movable along the configuration of the aperture 89. The main speed change lever 72, when moved to the position of one of the ends of the aperture 89, causes the shifter within the transmission case 4 to select one of the first to third speeds and reverse speed to be afforded by the main speed change unit, giving the desired speed to the main shaft. When shifted to the central position of the aperture 89, the lever 72 brings the main shaft into a neutral state. Display members 90 marked with "1", "2", "3" and "R" are provided on the upper surface of the panel main body 78 in corresponding relation to these speed change positions of the main speed change lever 72. The main body 88 also has a display member 90 marked with "MAIN" for identifying the lever 72. Each of the display members 90 comprises a plate 90a bearing the marking and a projection 90b on the lower side of the plate 90a. The projection 90b is removably fittable in a hole 91 formed in the main body 88. Each display member 90 is fittable to any one of holes 91.

The panel main body 88 is further formed with an aperture 92 H-shaped when seen from above for the PTO speed change lever 74 to extend therethrough. The PTO speed change lever 74, when shifted to the position of one of the ends of the aperture 92, causes the corresponding shifter within the transmission case 4 to select one of the first to fourth speeds to be afforded by the PTO speed change unit, giving the desired speed to the PTO shaft 24a. The other arrangement including display members 90 for the PTO system is similar to the one provided for the main speed change lever 72 and the aperture 89.

The panel main body 88 has another aperture 93 I-shaped when seen from above for the auxiliary (sub) speed change lever 73 to extend therethrough. The lever 73, when shifted to the position of one of the ends of the aperture 93, causes the corresponding shifter within the transmission case 4 to select a high or low speed for the auxiliary speed change shaft to give the desired speed to the shaft. The other arrangement including display members 90 for the auxiliary speed change system is similar to the one provided for the lever 72 and the aperture 89.

The panel main body 88, which is usually made of resin, is lined with a metal plate 94 which is integrally joined to the body or fastened thereto with screws 95 or the like for reinforcing the edges defining the apertures 89, etc. The reinforcing structure is shown, for example, in FIG. 5. The reinforcing plate 94 is partly fitted in the aperture 92 for PTO speed change to reinforce the edge defining the aperture 92 against striking contact of the PTO speed change lever 74 and also to guide the movement of the lever 74. Another example of reinforcing structure is shown in FIG. 6, in which a rubber or like elastic member 96 is sandwiched between the reinforcing plate 94 and the lower surface of the panel main body 88. The PTO speed change lever 74 is movable through a slit between the opposed portions of the elastic member 96 projecting into the aperture 92. In this case, the elastic member 96 absorbs the impact of striking contact of the lever 74 with the aperture defining edge and also shuts off the interior of the control panel assembly 70 from outside, preventing ingress of dust into the interior and confining noises in the interior of the assembly 70.

FIG. 7 shows an example of display member 90 including a projection 90a resembling an arrow head and removably fitted in the hole 91. Each display member 90 is interchangeably fittable in any other hole 91, such that when a speed change lever is changed or speed change positions are changed, the display members 90 concerned are installed in different positions in conformity with the change.

With reference to FIG. 4 and FIGS. 8 to 10, the side box 87 comprises inner and outer side plates 87a, 87b extending forward from the opposite sides of the right fender 30R, a front plate 87c interconnecting the front ends of these side plates 87a, 87b and a fender front plate forming part of the right fender 30R. The upper ends of these plates 87a, 87b, 87c are provided with a frame member 87d. The panel main body 88 is attached to the top of the frame member 87d in the manner already mentioned to openably close the opening 87e of the frame member 87d. At least the inner side plate 87a is removably connected to the frame member 87d to constitute part of the side box 87.

A base 97 for the speed change levers is disposed inside the side box 87 and is attached thereto removably by bolts 98. The base 97 extends forwardly downward in its entirety.

A main-auxiliary speed change lever shaft 99 in the form of a single rod is supported on a rear portion of the base 97 and extends laterally. A support 100 for the main speed change lever 72 is fitted around the shaft 99 at an axially inward portion thereof and is rotatable about the axis of the shaft relative thereto. The main speed change lever 72 is pivoted to the support 100 and is movable rightward and leftward. The support 100 has a spring 101 for turning the lever 72 outward sidewise. The support 100 is sandwiched between inner and outer coupling members 102 and 103 fitting around the shaft 99 and rotatable about the shaft relative thereto.

The inner coupling member 102 comprises a boss 102a fitting around the shaft 99 and rotatable relative thereto, and an inner coupling plate 102b extending upward from the boss 102a and bent at its upper end toward the lever 72. The bent end of the coupling plate 102b has a cutout 102c in which the lever 72 is engageable when pivotally moved laterally. One end of the inner wire 104a of a first Bowden cable 104 for main speed change is detachably pivoted to the inner coupling plate 102b. The same end of the outer wire 104b of the cable is detachably held by a holder 105 on the base 97. The cable holder 105, which is in the form of an angle bar piece, has one portion fixedly joined to the base 97 and the other portion formed with a U-shaped groove 105a. The outer wire 104b is removably fitted in the groove 105a. The grooved portion of the holder 105 is clamped between a pair of nuts 104c, 104c screwed on the outer wire 104b, whereby the wire 104b is held to the base 97. The cable holders 105 to be mentioned later have approximately the same construction as the holder 105 above.

The outer coupling member 103 comprises a boss 103a fitting around the shaft 99 and rotatable relative thereto, an outer coupling plate 103b extending upward from the boss 103a and bent at its upper end toward the main speed change lever 72, and a coupling projection 103e extending downward from the boss 103a. The bent end of the coupling plate 103b has a cutout 103c in which the lever 72 is engageable when pivotally moved laterally. One end of the inner wire 106a of a second Bowden cable 106 for main speed change is pivoted to the coupling projection 103e. The same end of the outer wire 106b of the cable is held by a cable holder 105 projecting from the lower side of the base 97.

The main speed change lever 72, when turned rightward or leftward in the center position of the aperture 89, alternatively engages in one of the cutouts 102c, 103c of the inner and outer coupling member 102, 103. When the lever 72 thus engaged is then turned forward or backward about the shaft 99 to the position of one end of the aperture 89, one of the coupling members 102, 103 rotates forward or backward with the lever 72, pushing or pulling one of the inner wires 104a, 106a coupled thereto.

A boss 107 for auxiliary speed change is fitted around the shaft 99 at an axially outward portion thereof and is rotatable relative to the shaft. The lower base end of the auxiliary speed change lever 73 is secured to the boss 107. A coupling member 108 for auxiliary speed change extends upward from the boss 107. One end of the inner wire 109a of a Bowden cable 109 for auxiliary speed change is pivoted to the upper end of the coupling member 108. The same end of the outer wire 109b of the cable is held by a cable holder 105 on the base 97.

The auxiliary speed change lever 73, when turned forward or backward, turns the coupling member 108 forward or backward along the aperture 93, pushing or pulling the inner wire 109a.

A first PTO speed change lever shaft 110 is supported at only one end by a bracket 111 on a front portion of the base 97. A first PTO coupling member 112 is fitted around the projecting end of the shaft 110 and is rotatable relative to the shaft. The coupling member 112 comprises a boss 112a removably fitted around the shaft 110 and rotatable relative thereto, and a PTO coupling plate 112b projecting upward from the bosss 112a and extending laterally like the axis of the shaft 110. The PTO speed change lever 74 has at its lower end a bifurcated portion 113 which is slidably fitted externally to the free end of the coupling plate 112b. The plate 112b and the bifurcated portion 113 are connected together by a pivot 114 having an axis extending in front-to-rear direction. The lever 74 is turnable rightward and leftward about the axis of the pivot 114. With the coupling plate 112b fitting in the bifurcated portion 113, the lever 74 and the coupling member 112 are movable together forward and backward about the axis of the shaft 110. One end of the inner wire 115a of a first Bowden cable 115 for PTO speed change is pivoted to the coupling plate 112b. The same end of the outer wire 115b of the cable is held by a cable holder 105 on the base 97.

Below the PTO speed change lever 74, there is provided on the base 97 a second PTO coupling member 117 in the form of a bell crank and rotatable about a second PTO speed change lever shaft 116 which is upright. A spherical engaging member 118 extends upward from one arm of the second PTO coupling member 112. A downwardly open groove 119 extending in front-to-rear direction is formed at the lower end of the bifurcated portion 113. The engaging member 118 is slidingly engageable in the groove 119. The center of the engaging member 118 thus engaged is positioned on the axis of the first PTO speed change lever shaft 110. When the lever 74 is turned forward or backward, the grooved portion 119 and the engaging member 118, which are in sliding contact, do not otherwise interfere with each other. On the other hand, when the lever 74 is turned rightward or leftward, the second PTO coupling member 117 is turned about the second PTO speed change lever shaft 116 by the engagement of the member 118 in the groove 119. One end of the inner wire 120a of a second Bowden cable 120 for PTO speed change is pivoted to the other arm of the coupling member 117. The same end of the outer wire 120b of the cable is held by a cable holder 105 on the base 97.

When the lever 74 is turned rightward or leftward as positioned in the center of the aperture 92, the inner wire 120a of the second Bowden wire 120 is pushed or pulled alternatively by the engagement of the member 118 in the groove 119 and the resulting movement of the coupling member 117. With the wire 120a thus pushed or pulled, the lever 74 is turned forward or backward about the shaft 110 to the position of one end of the aperture 92, whereby the coupling member 112 is turned forward or backward with the lever 74 by virtue of the fitting connection of the bifurcated portion 113 to the coupling plate 112b. Consequently the inner wire 115a of the first Bowden cable 115 is pushed or pulled.

Below the main-auxiliary speed change lever shaft 99, there is provided under the base 97 a speed change lever shaft 121 for super-reduction as supported by a fixed boss 122, the shaft 121 being rotatable about its axis. The axially inner end of the shaft 121 extends withdrawably through the inner plate 87a into the operator's station A. The speed change lever 75 for super-reduction, which is made of metal plate, is removably attached to the inner shaft end by a bolt 123. The lever 75 extends upward and is turnable forward or backward. The axially outer end of the lever shaft 121 is provided with a coupling bar 124 which extends downward. One end of the inner wire 125a of a Bowden cable 125 for speed change by super-reduction is pivoted to the lower end of the coupling bar 124. The same end of the outer wire 125b of the cable is held by a cable holder 105 on the lower side of the base 97.

Each of the speed change levers 72, 73, 74, 75 is provided at its upper end with a removable grip 126 for the operator. With the grips 126 removed from the levers, the panel main body 88 can be detachably installed in place because of the construction described above. When the panel main body 88, the Bowden cables 104, 106, 109, 115, 120, 125 and the speed change lever 75 are further removed, the base 97 having the other speed change levers 72, 73, 74, etc. attached thereto as an assembly can be removed from or installed in the side box 87 through the opening 87e and/or through an opening formed by removing the inner plate 87a.

With reference to FIGS. 11 to 14, a support 128 is removably attached to the top of the transmission case 4 by bolts 127 as if covering the front and the opposite sides of the mount 37. Two cable holders 105 are mounted on each side of the support 128. The outer wires 104b, 106b of the first and second Bowden cables 104, 106 for main speed change and the outer wires 115b, 120b of the first and second Bowden cables 115, 120 for PTO speed change are removably held by these holders 105. The outer wires 109b, 125b of the Bowden cables 109, 125 for auxiliary speed change and super-reduction are held by holders 105 removably mounted on the transmission case 4. The other ends of the inner wires 104a, 106a, 109a, 115a, 120a, 125a are pivoted to shift levers 130 individually fitted to six shift rods 129 extending into the transmission case 4. Each shift rod 129 is supported rotatably about its axis and coupled to a shifter within the transmission case 4. The top portion of the support 128 has the bottom plate 55a of the box 55 attached thereto by bolts 131 to support the box. The battery 58 is removably mounted on the bottom plate 55a. The shift rods 129, etc. are covered with a cover 132 detachably attached to the transmission case 4.

The speed change units within the case 4 are known and will not be described. The main, auxiliary, PTO and super-reduction speed change units coupled to the speed change levers 72, 73, 74, 75 respectively are coupled to one another within the case 4. Various combinations of speed change positions for the speed change levers 72 to 75 enable the tractor to travel at varying speeds and give the PTO shaft 24a different speeds of rotation for the working implement 24 to perform the desired work.

FIGS. 15 to 22 show an embodiment wherein the side box 87 is provided with a door.

Figure 20:
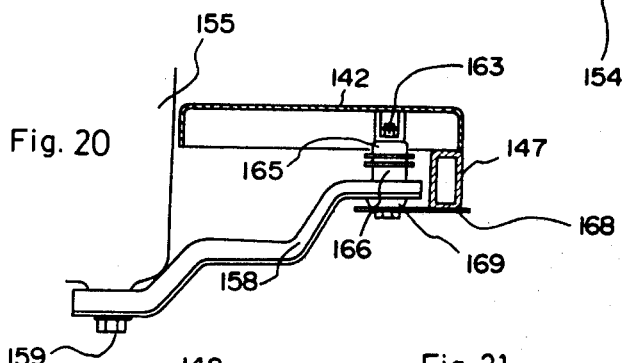
FIG. 20 is a sectional view showing a rear bracket assembly.
Figure 22:
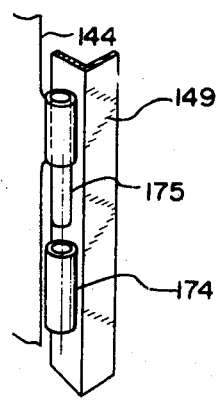
FIG. 22 is a perspective view showing a hinge for supporting a door.
Figure 21:
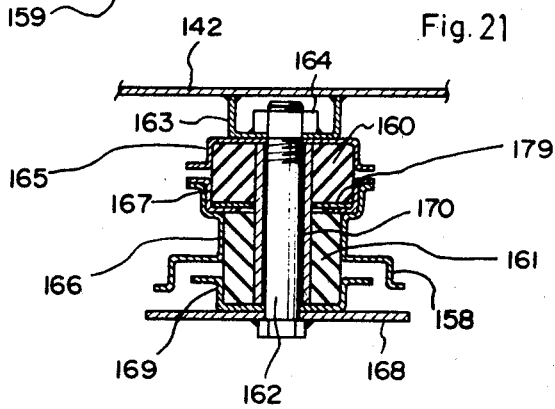
FIG. 21 is a sectional view showing a vibration absorbing assembly.

A front step 141 and a rear step 142 are provided on each side of an intermediate portion of a tractor body 140. In front of a rear wheel fender 143 on one side, a door 144 is disposed at the outer ends of the front and rear steps 141, 142. The front step 141 is attached to a side portion of the body 140, such as a clutch housing 146, with bolts 145 and is fixedly supported by a support member 147 extending longitudinally of the tractor body at the laterally outer end of the step 141. The support member 147 is integrally joined at its front end to a front bracket 148 as by welding. A post 149 in the form of an angle bar is fixed to the junction. The front bracket 148 is bent in a stepped form so as not to interfere with hydraulic hoses 150, etc. and secured to the bottom of the clutch housing 146 with a single bolt 151. The front steps 141 are formed with openings 154 for brake pedals 152, clutch pedal 153, etc. to extend therethrough. These pedals 152, 153 are supported by a lateral pedal shaft 156 which in turn is supported by a transmission case 155 below the rear steps 142. The rear steps 142 are connected to the rear wheel fenders 143, a floor cover 157, etc. A rear bracket 158 attached to the bottom of the transmission case 155 with two bolts 159 is bent so as not to interfere with the pedals 152, 153 or the like and extends sidewise. As shown in FIGS. 20 and 21, the rear step 142 and the support member 147 are fastened to the outer end of the bracket 158 with use of vibration absorbing members 160, 161 and by means of a single bolt 162. Stated more specifically, a nut 164 and a dishlike bearing member 165 are connected to the lower side of the rear step 142 by a bracket 163. The rear bracket 158 is provided with a tubular portion 166 and a bearing member 167, and the support member 147 has a bearing member 169 connected thereto by a bracket 168. The vibration absorbing member 160 is interposed between the bearing members 165, 167, and the member 161 between the bearing members 167, 169. A collar 170 is provided between the bearing members 165, 169 across the vibration absorbing members 160, 161. The bolt 162 is screwed into the nut 164 from below the bracket 168 to fasten the above members together. A speed change board 172 having speed change levers 171 is provided on the upper side of the door 144. The levers 171 are coupled to speed change units by push-pull wires or the like. The door 144 is openably supported by upper and lower two hinges 173 on the post 149. As shown in FIG. 22, the hinge 173 comprises a support tube 174 on the post 149 and a pin 175 removably insertable into the tube 174 from above.

Accordingly the door 144 is removably connectable to the post 149. The door 144 has at its lower portion a window aperture with a transparent panel fitted therein. The upper end of the post 149 is connected by a connector 176 to a holder 177 on the bonnet. A transparent or like windshield 178 is fitted in the portion surrounded by the post 149, front step 141, connector 176, etc. Indicated at 179 is a flat washer.

When there arises a need to ride on or alight from the tractor at one side thereof where the speed change board 172 is installed, the door 144 attached to the board 172 is unlocked and opened on the hinges 173, hence more convenient than when the operator's station is accessible from only one side. In this case, the door 144 must be supported by a strong structure. According to the invention, the support member 147 for the steps 141, 142 is connected to the front bracket 148 extending sidewise from a lower portion of the tractor body 140, and the door 144 is supported by the post 149 fixed to the connection, so that the post can be supported stably. The door 144 can therefore be supported with much greater strength than when the post is provided on a single bracket. Moreover, the support member 147 and the front bracket 148, which are connected together, are restrained by each other and consequently have improved stability. Since the rear step 142 and the support member 147 are connected to the rear bracket 158 with use of the interposed vibration absorbing members 160, 161, transmission of vibration from the tractor body 140 can be interrupted. This makes the tractor comfortable to ride on. Further because the rear step 142 and the support member 147 are fastened together by only one bolt 162 which is screwed in from below, the vibration absorbing assembly is simple in construction and easy to fabricate. The nut 164 for the bolt 162 is attached to the bracket 168 on the rear step 142, so that there is no projection on the upper side of the step.

The rear step 142 may be integral with the floor cover 157 but may be made removable from the rear wheel fender 143. The front and rear steps 141, 142 can be integral with each other.

What is claimed is:

1. An agricultural tractor comprising:
   a tractor body;
   a plurality of speed change levers mounted on the tractor body;
   a plurality of pedals provided forwardly and rearwardly on the tractor body, respectively, the rearward pedals being at a higher position than the forward pedals;
   a seat selectively fixable to a rearward position opposed to the forward pedals and a forward position opposed to the rearward pedals, the forward position being higher than the rearward position; and
   a post having a steering wheel, the post being selectively fixable to a forward position corresponding to the forward position of the pedals and a rearward position corresponding to the rearward position of the pedals, the steering wheel facing the seat to whichever position the post is fixed.

2. A tractor as defined in claim 1, wherein the post is mounted to the tractor body such that the rearward position is higher than the forward position.

3. A tractor as defined in claim 2 wherein the post is fixed to the rearward position at an angle closer to vertical than when fixed to the forward position.

4. A tractor as defined in claim 3, wherein the speed change levers are disposed laterally of the tractor body.

5. A tractor as defined in claim 4, wherein the speed change levers are disposed laterally of the tractor body and substantially halfway between the steering wheel and the seat.

* * * * *